US011963914B2

(12) United States Patent
Carr

(10) Patent No.: US 11,963,914 B2
(45) Date of Patent: Apr. 23, 2024

(54) INTERFACING WHEELCHAIRS WITH OTHER APPARATUSES

(71) Applicant: Kevin Jon Carr, Chatfield, MN (US)

(72) Inventor: Kevin Jon Carr, Chatfield, MN (US)

( * ) Notice: Subject to any disclaimer, the term of this patent is extended or adjusted under 35 U.S.C. 154(b) by 424 days.

(21) Appl. No.: 17/493,552

(22) Filed: Oct. 4, 2021

(65) Prior Publication Data

US 2022/0104978 A1 Apr. 7, 2022

Related U.S. Application Data

(60) Provisional application No. 63/087,738, filed on Oct. 5, 2020.

(51) Int. Cl.
*A61G 3/06* (2006.01)
*A61G 7/10* (2006.01)

(52) U.S. Cl.
CPC ........... *A61G 3/061* (2013.01); *A61G 7/1038* (2013.01)

(58) Field of Classification Search
CPC ....... A61G 3/061; A61G 3/068; A61G 7/1038
USPC ............................................................ 108/92
See application file for complete search history.

(56) References Cited

U.S. PATENT DOCUMENTS 1,305,281 A * 6/1919 Hall ........................ E06C 1/387 182/206
1,615,323 A * 1/1927 Brown ...................... A47F 3/14 108/92
2,622,658 A * 12/1952 Morgan ................. A47C 12/02 182/35
2,805,703 A * 9/1957 Wise ...................... A47C 12/02 182/33.3
2,871,914 A * 2/1959 Timoney ................ A47D 13/04 482/52
3,142,355 A * 7/1964 Danielson ................. E06C 1/39 182/161
3,553,746 A * 1/1971 Seiger .................. A61G 7/1046 5/503.1
3,564,790 A * 2/1971 Rehfeld .................. E04F 11/06 108/92
3,948,191 A * 4/1976 Hatherley ............. A47B 43/00 108/92
4,250,977 A * 2/1981 Deli ....................... A47C 12/02 182/33.6
4,288,124 A 9/1981 Hamilton
4,418,792 A * 12/1983 Cerone ................ A61G 7/1044 182/106
4,646,655 A * 3/1987 Robolin ................. A47B 21/00 108/92
5,357,876 A * 10/1994 Kniefel ..................... E04H 3/12 108/92
5,425,615 A * 6/1995 Hall ....................... A61G 3/068 280/166
5,579,702 A * 12/1996 Aho .......................... A47F 5/10 108/92
5,730,068 A * 3/1998 Rioux, Jr. ................. A47F 5/10 108/92

(Continued)

*Primary Examiner* — Jose V Chen
(74) *Attorney, Agent, or Firm* — Fish & Richardson P.C.

(57) ABSTRACT

Devices described in this disclosure can be used to assist persons with limited mobility to transfer themselves from a wheelchair to another apparatus, and back again. For example, this document describes devices that persons with limited use of their legs can use to transfer themselves between a wheelchair and another apparatus, such as a handcycle, that has a seat at a lower elevation than the seat of the wheelchair.

13 Claims, 12 Drawing Sheets

(56) References Cited

U.S. PATENT DOCUMENTS 5,870,788 A * 2/1999 Witkin .................... B66F 7/243 414/921
5,992,563 A * 11/1999 Kessler .................... E06C 1/28 297/440.1
6,571,915 B1 6/2003 de la Tour
6,669,287 B1 12/2003 DeLilla
6,719,094 B2 4/2004 de la Tour
6,843,347 B2 1/2005 Lamberson et al.
6,926,119 B1 * 8/2005 Schrock .................. E06C 1/393 182/152
7,770,743 B1 * 8/2010 Janowak ................ A47G 7/042 108/92
8,037,649 B2 * 10/2011 Jakubowski ........... A47C 12/00 D25/63
8,186,550 B2 5/2012 Sampson
8,393,684 B2 3/2013 Peraza
8,701,830 B2 * 4/2014 Merey ..................... E06C 1/383 108/92
8,925,682 B2 * 1/2015 Chitayat ................ A47C 12/00 182/152
9,878,196 B2 * 1/2018 Lin ........................ A63B 21/16
9,889,339 B2 * 2/2018 Douglass ................. A63B 5/11
10,610,058 B2 4/2020 Castillo
11,089,898 B2 * 8/2021 Vizcarrondo .......... A47G 25/90
2003/0051299 A1 * 3/2003 Bearint .................. A61G 3/068 14/69.5
2003/0075080 A1 * 4/2003 Allen ................. A47B 21/0314 108/92
2003/0093858 A1 5/2003 Maizel
2004/0034950 A1 * 2/2004 Massaro ............... E04F 11/002 14/69.5
2004/0107519 A1 * 6/2004 Grody .................... A61G 7/053 14/69.5
2005/0139561 A1 * 6/2005 Ohkubo ................ A47F 5/0062 211/186
2009/0124464 A1 * 5/2009 Kastelic ............. A63B 23/0458 482/52
2010/0026075 A1 2/2010 Zenisek
2011/0079466 A1 * 4/2011 Peraza .................... E06C 1/397 182/141
2015/0224004 A1 * 8/2015 Miller ...................... A61G 5/14 135/65
2015/0313355 A1 * 11/2015 Holmes ................ A47B 13/088 108/92
2017/0273841 A1 * 9/2017 Maidens .............. A61G 7/1034
2018/0098902 A1 * 4/2018 Richter .................... A61H 3/00
2018/0133081 A1 * 5/2018 Kaufman ............... A47C 16/00
2019/0175429 A1 * 6/2019 Silverstein ........... A61G 7/1038

* cited by examiner

Shelf In

Shelf Mid

Shelf Out

INTERFACING WHEELCHAIRS WITH OTHER APPARATUSES

CROSS-REFERENCE TO RELATED APPLICATIONS

This application claims the benefit of U.S. Provisional Application Ser. No. 63/087,738, filed Oct. 5, 2020. The disclosure of the prior application is considered part of (and is incorporated by reference in) the disclosure of this application.

BACKGROUND

1. Technical Field

This document relates to assist devices that persons with limited mobility can use to transfer themselves from a wheelchair to another apparatus, and back again. For example, this document relates to assist devices that persons with limited use of their legs can use to transfer themselves between a wheelchair and another apparatus such as a handcycle.

2. Background Information

A wheelchair is a wheeled mobility device in which the user sits. The device is propelled either manually (by turning the wheels by the hand) or via various automated systems. Wheelchairs are used by people for whom walking is difficult or impossible due to illness (physiological or physical), injury, or disability. There are an estimated 3.3 million wheelchair users in the United States, and the number is increasing every year.

A wheelchair can assist people to become more mobile and independent. However, some common tasks that are routine for people that can walk can be difficult for a wheelchair user. One such example is transferring from the wheelchair to another sitting apparatus, especially when the elevation of the seats are differing. Without some kind of device to assist with gradually making the elevation changes, such an endeavor is very difficult, if not nearly impossible, to perform.

There are a great number of persons who, for a multitude of reasons, must rely upon wheelchairs for independent mobility. For example, many people have sustained spinal cord injuries that have left these people without the use of their legs. Others have sustained injuries or have other disabilities that limit the use of their legs. Nonetheless, these individuals often retain use of their upper bodies and are capable and desirous of all manner of activities and interactions. Many of these activities, such as using a handcycle, require the wheelchair user to transfer from the wheelchair to the seat of the handcycle and from the handcycle back into the wheelchair. These activities often occur in a multitude of locations. It is often problematical for such persons to safely and efficiently transfer from the wheelchair to the handcycle and back into the wheelchair without the assistance of another individual or the assistance of some fixed transfer apparatus.

SUMMARY

This document describes devices that persons with limited mobility can use to transfer themselves from a wheelchair to another apparatus, and back again. For example, this document describes devices that persons with limited use of their legs can use to transfer themselves between a wheelchair and another apparatus such as, but not limited to, a handcycle.

In one aspect, this disclosure is directed to a device for assisting a person with limited mobility to transfer between a wheelchair and another apparatus. The device can include a first structure positionable on a surface and having a plurality of first platforms at differing elevations relative to the surface. The plurality of first platforms are positioned adjacent to each other along a first longitudinal axis of the first structure. The device also includes a handrail extending longitudinally along a first lateral side of the first structure such that access to an opposite, second lateral side of the first structure is clear of the handrail and any other obstructions. At least one platform of the plurality of first platforms defines an elongate groove extending parallel to the first longitudinal axis.

Such a device for assisting a person with limited mobility to transfer between a wheelchair and another apparatus may optionally include one or more of the following features. In some embodiments, the plurality of first platforms comprises four platforms. Each platform of the four platforms can define the groove extending parallel to the first longitudinal axis. Each platform of the four platforms can define two of the grooves extending parallel to the first longitudinal axis. The device may also include a second structure positionable on the surface and having a plurality of second platforms at differing elevations relative to the surface. The plurality of second platforms can be positioned adjacent to each other along a second longitudinal axis of the second structure. The handrail can extend longitudinally along a first lateral side of the second structure such that access to an opposite, second lateral side of the second structure is clear of the handrail and any other obstructions. The handrail may include a bifurcated lower end. The handrail may include a horizontally-extending handrail at an upper end of the handrail.

In addition, such a device for assisting a person with limited mobility to transfer between a wheelchair and another apparatus may optionally include one or more of the following features. The device may also include a shelf that is longitudinally translatable relative to the first structure between: (i) a first position in which the shelf covers a particular platform of the plurality of first platforms and (ii) a second position in which the particular platform is not covered by the shelf. The device may also include a shelf that is pivotable relative to the first structure between: (i) a first position in which the shelf covers a particular platform of the plurality of first platforms and (ii) a second position in which the particular platform is not covered by the shelf. The device may also include a support member extending from the first structure and configured to rest on or be attached to the surface. The device may also include a support member attached to the first structure. The support member can be movable relative to the first structure between: (i) a first position that extends from the first structure and (ii) a second position in which the support member is retracted closer to the first structure than in the first position. In some embodiments, the support member is pivotable relative to the first structure. In particular embodiments, a length of the support member is adjustable.

Particular embodiments of the subject matter described in this document can be implemented to realize one or more of the following advantages. In some embodiments, the devices and methods described herein can allow wheelchair users to transfer themselves, using only their upper limbs, from a wheelchair to another apparatus that has a seat at a lower elevation than the seat of the wheelchair. Such a result can add to the independence and productivity of a wheelchair user in a satisfying and advantageous manner. For example, in some cases, people with limited use of their legs can use the devices described herein to independently transfer themselves between a wheelchair and a handcycle. Other advantages can be identified in view of the detailed descriptions of the devices and methods provided herein.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document describes devices that persons with limited mobility can use to transfer themselves from a wheelchair to another apparatus, and back again. For example, this document describes devices that persons with limited use of their legs can use to transfer themselves between a wheelchair and another apparatus such as, but not limited to, a handcycle.

Figure 1:
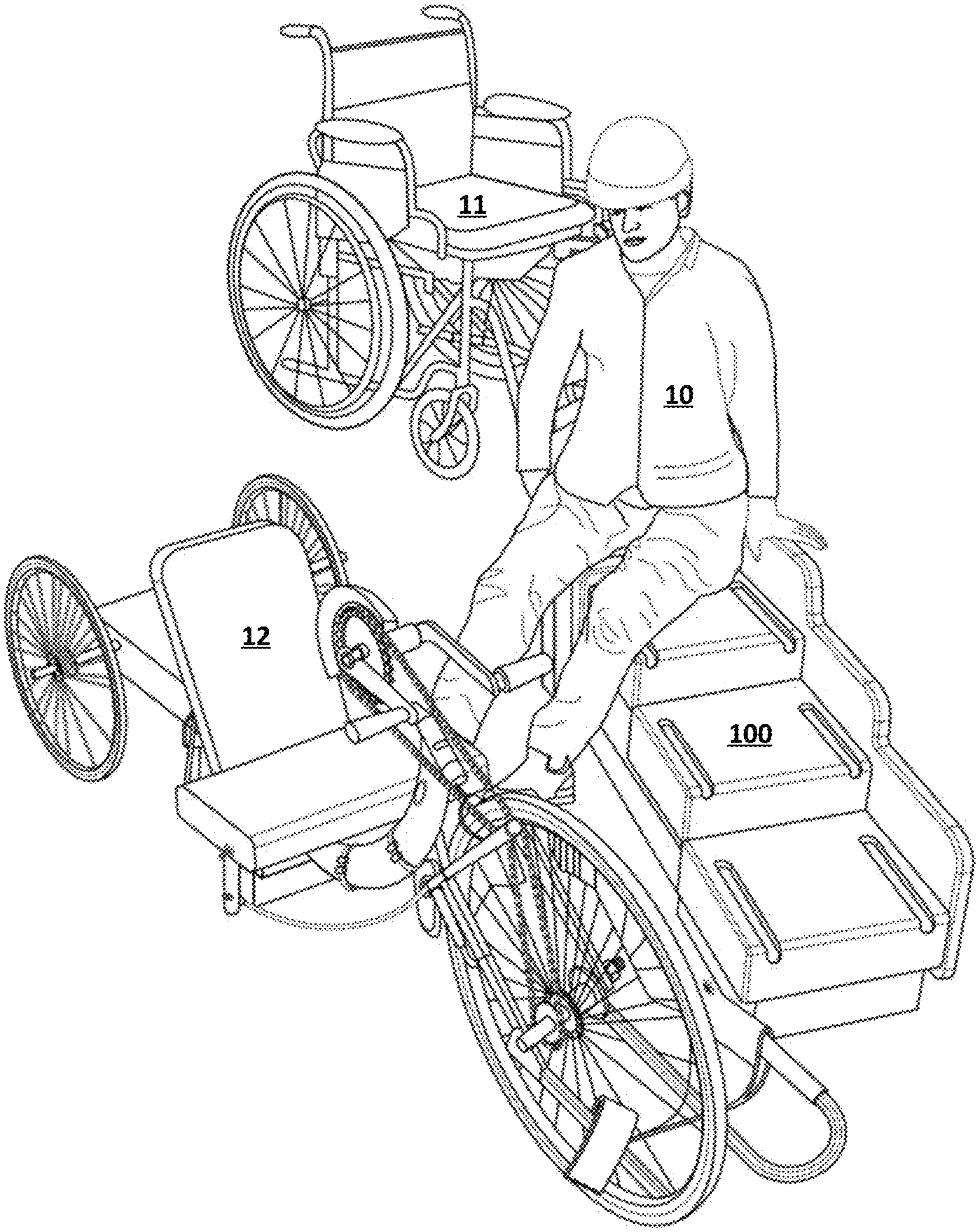
FIG. 1 shows a wheelchair user in the process of using an example assistance device to transfer themselves between a wheelchair and a handcycle.

As shown in FIG. 1, a person 10 with limited mobility can use an assistance device 100 of the present disclosure to transfer themselves between a wheelchair 11 and a handcycle 12 using their upper limbs. While a handcycle 12 is used herein as an example of an apparatus that the person 10 can transfer himself or herself into using the assistance device 100, of course the assistance device 100 can be used in conjunction with other apparatuses in addition to a handcycle 12. For example, in some cases the assistance device 100 can be positioned on a dock and used for transferring between a wheelchair 11 and a boat (e.g., a kayak, a canoe, a runabout, and the like). Accordingly, the use herein of the handcycle 12 is just one example of the context in which the assistance device 100 can be utilized.

As an example, the assistance device 100 can be placed at trailheads for bicycle trails that allows a wheelchair user (or anyone with a mobility challenge) to move from their chair 11 to a handcycle 12 or trike. In some cases, the assistance device 100 can be permanently mounted at the site. Portions, or all of, the assistance device 100 can be rotationally molded plastic (e.g., like a kayak body) and fit the definition of "reasonable accommodation" for ADA purposes.

In general, as described further below, the assistance device 100 is structure with a series of adjacent platforms of increasing/decreasing elevations positioned adjacent to each other along a first longitudinal axis of the first structure. In some embodiments, the platforms include one or more incorporated handles (e.g., grooves in the platform's surface) that allow a person 10 to get a grip on the platforms as he/she moves from one level to another using only his/her arms.

Figure 2:
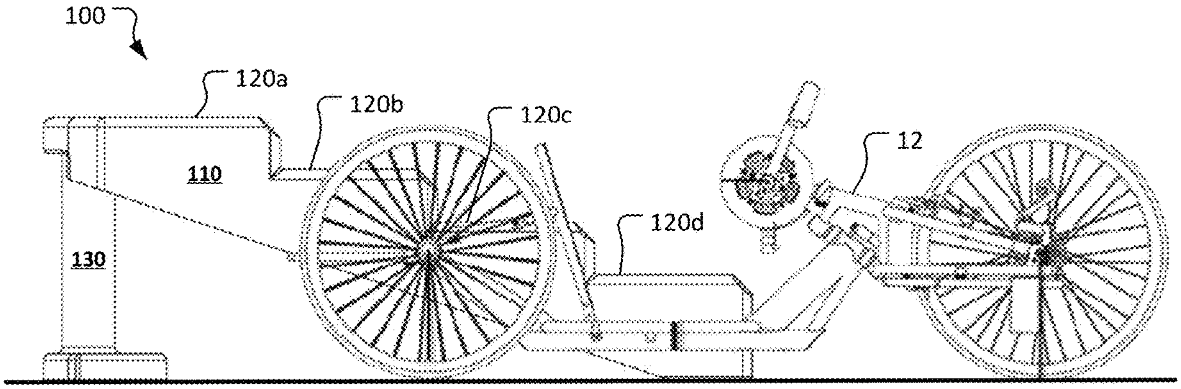
FIG. 2 shows a side view that illustrates the elevation differences between the seat of a wheelchair (top platform) and the seat of a handcycle.

FIG. 2 shows an elevation view of the example assistance device 100 in comparison to a typical handcycle 12. The assistance device 100 includes a structure 110 that includes four platforms 120*a*, 120*b*, 120*c*, and 120*d*, in this example. The uppermost platform 120*a* is at the elevation of a typical seat of a wheelchair. The lowermost platform 120*d* is at or slightly above the elevation of a typical seat of the handcycle.

Figure 3:
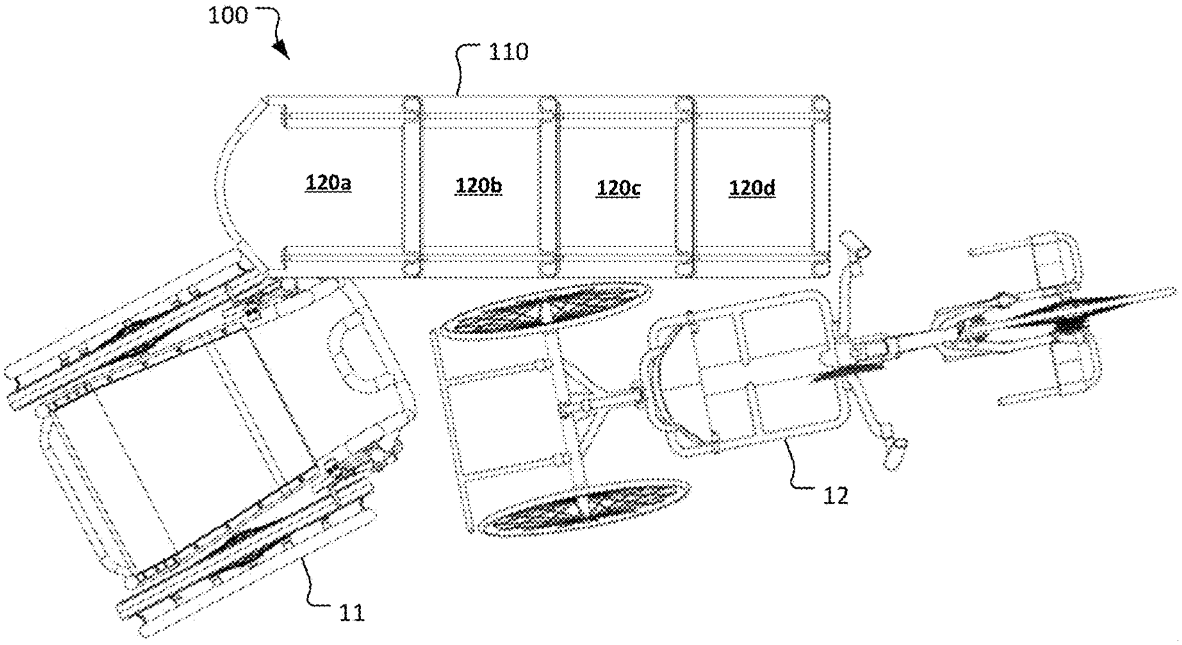
FIG. 3 shows a top view of a wheelchair, example assistance device, and a handcycle.
Figure 4:
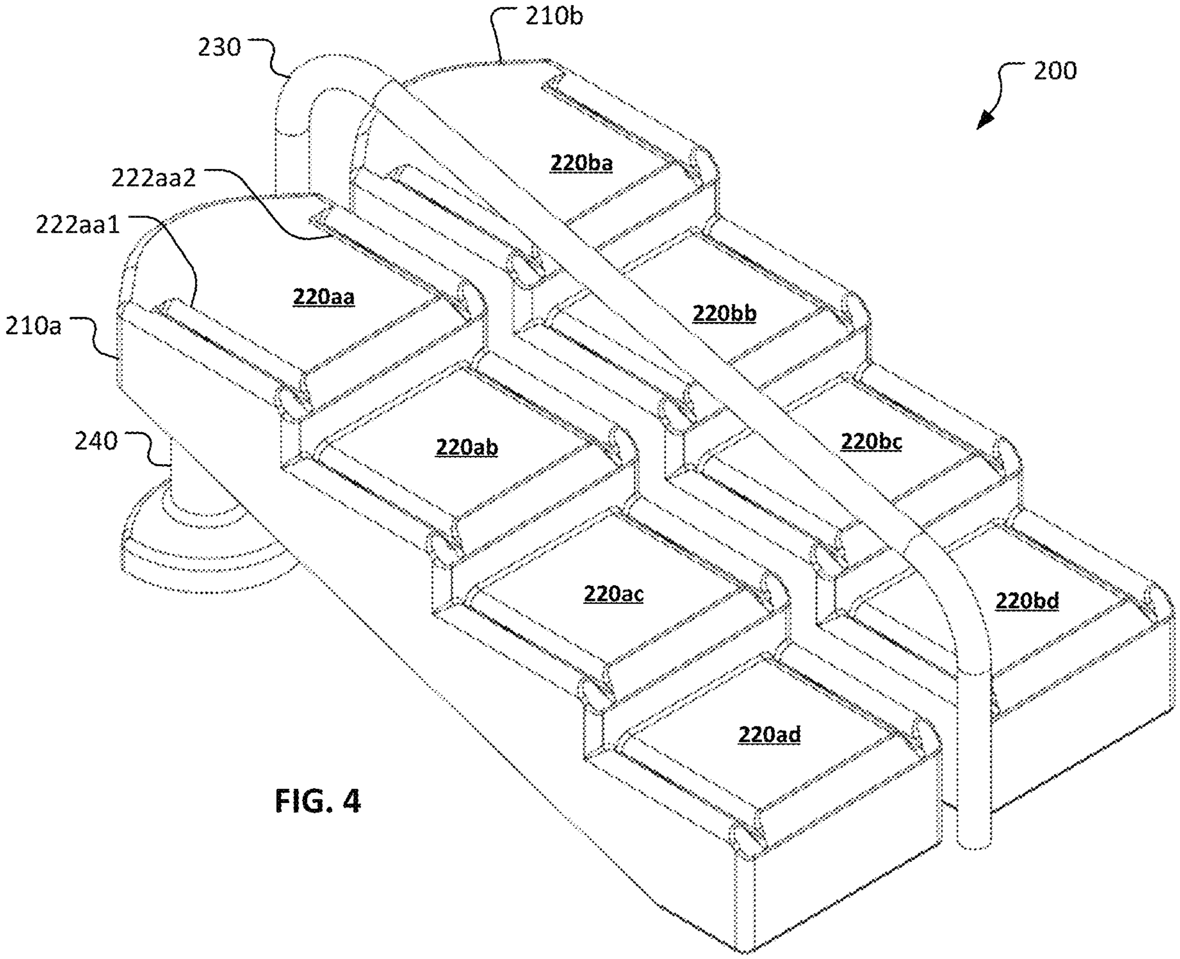
FIGS. 4-7 show various views of another example assistance device in accordance with some embodiments.
Figure 6:
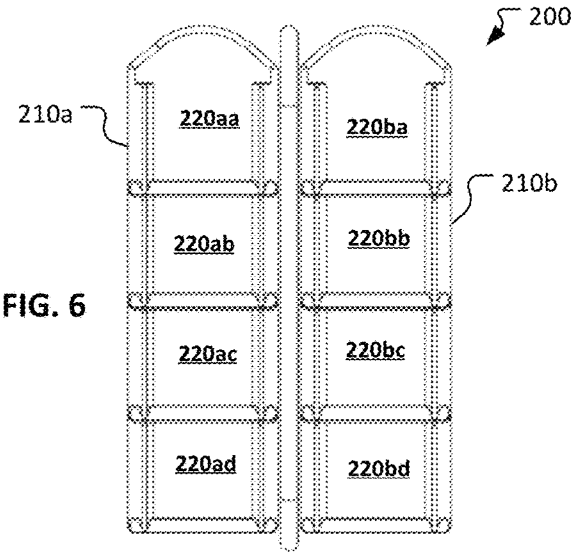
Figure 7:
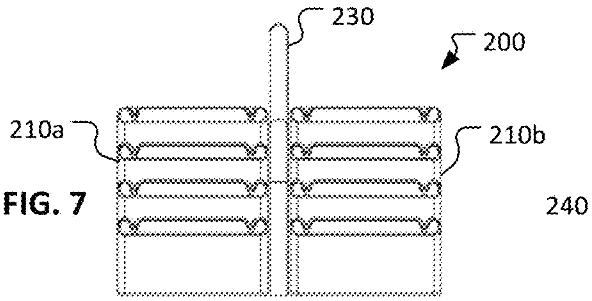
Figure 5:
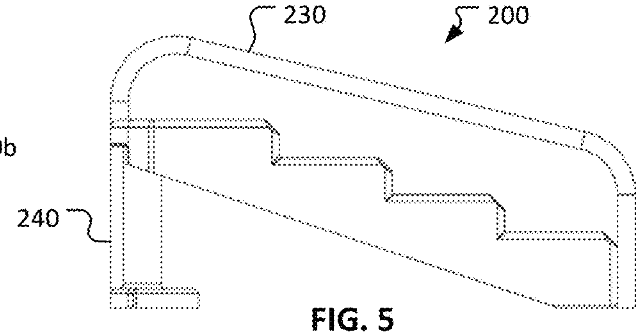

FIG. 3 shows a wheelchair, the assistance device 100, and the handcycle near to each other as could be the case when a person is using the assistance device 100 to transfer themselves between the wheelchair and the handcycle.

To transfer from a wheelchair to the handcycle, a person would first move from the seat of the wheelchair to the uppermost platform 120*a*. Then, the person would move from the uppermost platform 120*a* to the platform 120*b*. Then, from the platform 120*b* to the platform 120*c*. Then, from the platform 120*c* to the platform 120*d*. Finally, from the platform 120*d* to the seat of the handcycle. To transfer from the handcycle to the wheelchair would be the reverse process.

The assistance device 100 can include a number of features that make the transfer process easier for a person with limited mobility to perform. This disclosure describes a number of different embodiments of the assistance device 100, and a number of different features that can be included in the assistance devices. It should be understood that any and all combinations of embodiments and features can be mixed and matched as desired, and that all resulting embodiments are within the scope of this disclosure.

FIGS. 4-7 shows another example assistance device 200. The assistance device 200 includes a first structure 210*a*, a second structure 210*b*, and a handrail 230 positioned between the first structure 210*a* and the second structure 210*b*. The handrail 230 extends longitudinally along a first lateral side of the first structure 210*a* such that access to an opposite, second lateral side of the first structure 210*a* is clear of the handrail 230 and any other obstructions. In a reciprocal (mirror image) manner, the handrail 230 extends longitudinally along a first lateral side of the second structure 210*b* such that access to an opposite, second lateral side of the second structure 210*b* is clear of the handrail 230 and any other obstructions.

Figure 12:
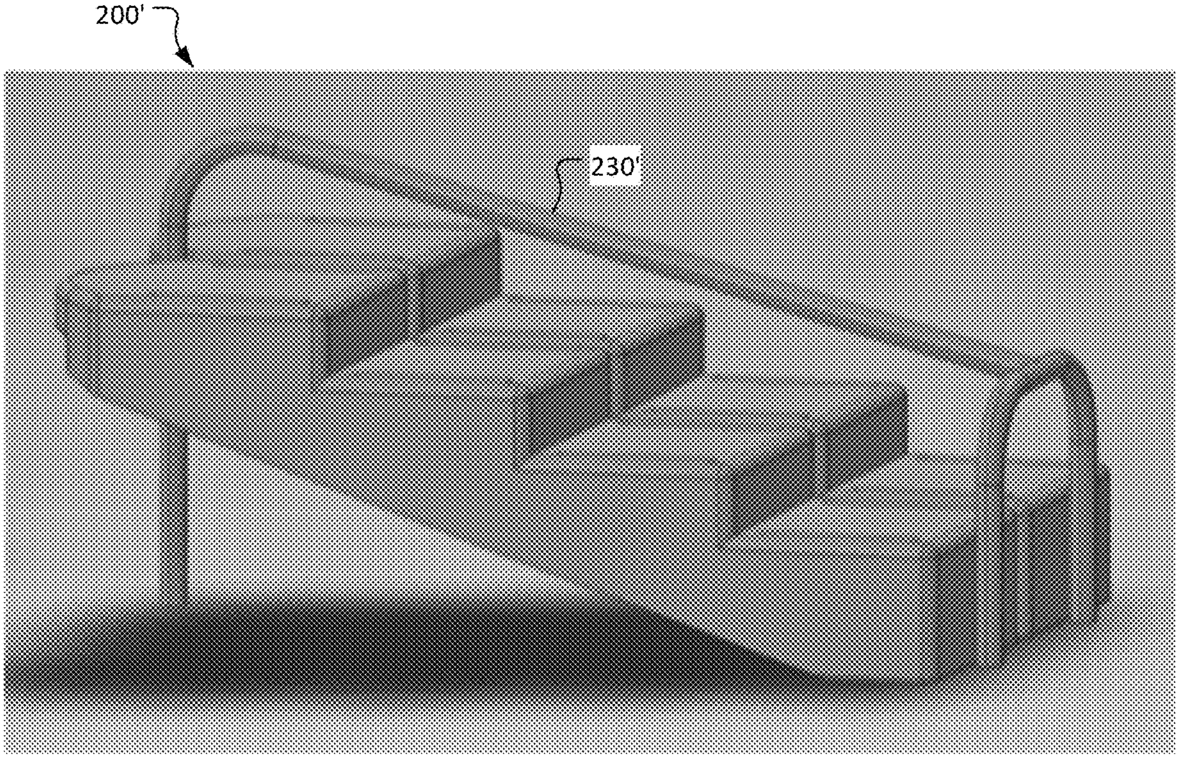
FIG. 12 shows a perspective view of another example assistance device in accordance with some embodiments.
Figure 13:
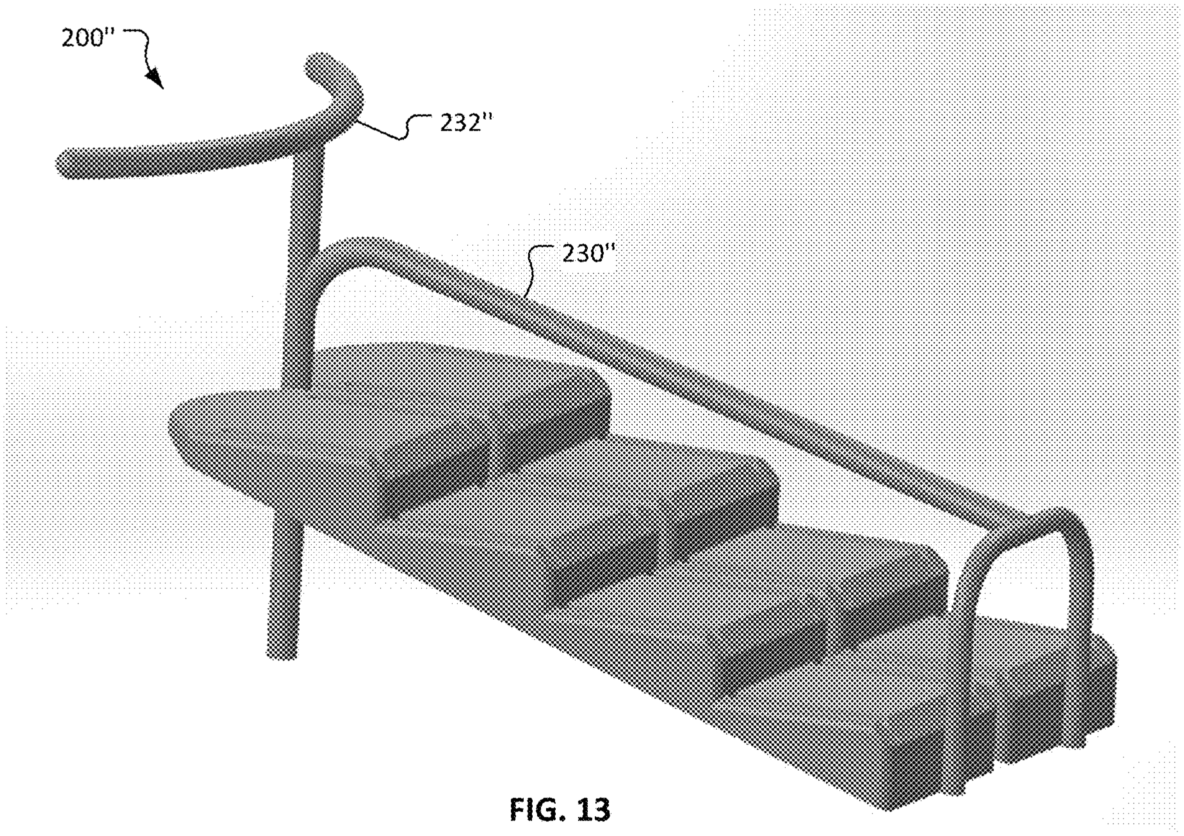
FIG. 13 shows a perspective view of another example assistance device in accordance with some embodiments.

The handrail 230 is optional. Some embodiments of the assistance device 200 do not include the handrail 230. As shown in the example of FIG. 12, a variation of the assistance device 200' can include a handrail 230' that has a bifurcation at the lower end of the assistance device 200'. That is, the handrail 230' divides into two portions at its end that is adjacent to the lowest platform. In another example as shown in FIG. 13, another variation of the assistance device 200" can include a handrail 230" that has a bifurcation at the lower end of the handrail 230", and that has an arcuate, horizontally-extending handrail 232" at the upper end of the handrail 230". The handrail 232" at the upper end of the assistance device 200" can be used for various functions such as for leaning against, or for grabbing onto, while swinging a leg over a conventional bicycle. Any appropriate shape can be used for the handrail 232". The horizontally-extending handrail 232" at the upper end may also be included in the embodiments of assistance devices that include a single structure of platforms (e.g., refer to FIGS. 9A-C).

Still referring to FIGS. 4-7, the dual design of the assistance device 200 provides the functional advantage of allowing users to transfer between a wheelchair and the assistance device 200 either from right-to-left (using the first structure 210*a*) or from left-to-right (using the second structure 210*b*), depending on their preference and/or strength. Alternatively, in some embodiments of the assistance devices described herein, a single structure 210*a* or 210*b* is included, and the handrail 230 is only on a single side of the single structure.

The assistance device 200 includes a support member 240. The support member 240 extends from one or more of the structures 210*a*/210*b*. The support member 240 is configured to rest on, or be attached to, a surface such as the ground, pavement, and the like.

In the depicted example, each structure 210*a* and 210*b* of the assistance device 200 includes four platforms. That is, the first structure 210*a* includes the platforms 220*aa*, 220*ab*, 220*ac*, and 220*ad*. Likewise, the second structure 210*b* includes the platforms 220*ba*, 220*bb*, 220*bc*, and 220*bd*. It should be understood that in some embodiments fewer or more than four platforms are included. For example, in some embodiments two, three, five, six, seven, eight, nine, ten or more than ten platforms are included in some embodiments. While each structure 210*a* and 210*b* includes the same number of platforms in this example, in some embodiments the structures 210*a* and 210*b* can have differing numbers of platforms in comparison to each other.

The platforms 220*aa*, 220*ab*, 220*ac*, and 220*ad* and 220*ba*, 220*bb*, 220*bc*, and 220*bd* are at differing elevations in comparison to each other. For example, platform 220*aa* is the highest of the first structure 210*a*, and platform 220*ad* is the lowest. Platforms 220*ab* and 220*ac* are incrementally in between the elevations of platforms 220*aa* and 220*ad*. In some embodiments, an incremental elevation difference between adjacent platforms is about 3 inches to 5 inches, or about 2 inches to 5 inches, or about 2 inches to 4 inches, or about 1 inch to 4 inches, or about 2 inches to 6 inches, without limitation.

In the depicted embodiment, the platforms 220*aa*, 220*ab*, 220*ac*, and 220*ad* and 220*ba*, 220*bb*, 220*bc*, and 220*bd* each define two elongate grooves extending longitudinally (as shown). For example, the platform 220*aa* defines a first elongate groove 222*aa*1 and a second elongate groove

222*aa*2. These grooves 222*aa*1 and 222*aa*2 provide gripping locations or handholds that a user can utilize, in addition to the handrail 230, while moving between the adjacent platforms. While in the depicted embodiment each platform defines two grooves, in some embodiments each platform defines a single such groove. The single groove can be near to (along) either side of the platforms, i.e., near to the side where the handrail 230 is positioned, or near to the opposite side of where the handrail 230 is positioned.

While in the depicted embodiment each platform defines one or more grooves, in some embodiments one or more of the platforms define one or more grooves and other platforms do not define a groove. The elongate grooves in the platforms can extend the entire longitudinal length of the platform, or along a partial longitudinal length of the platform.

In some embodiments, the one or more elongate groove(s) defined in the platform(s) are near to one or both side edge(s) of the platform(s). For example, in some embodiments a centerline of the longitudinally-extending grooves are about 1 inch to 3 inches away from the side edge, or about 0.5 inch to 3 inches away from the side edge, or about 1 inch to 4 inches away from the side edge, without limitation.

Figure 8A:
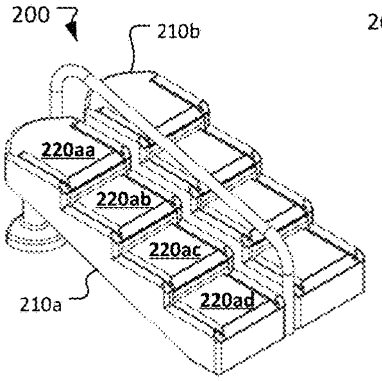
FIGS. 8A-C show perspective views of another example assistance device in accordance with some embodiments.
Figure 8B:
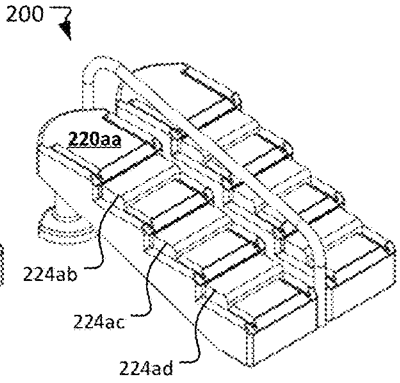
Figure 8C:
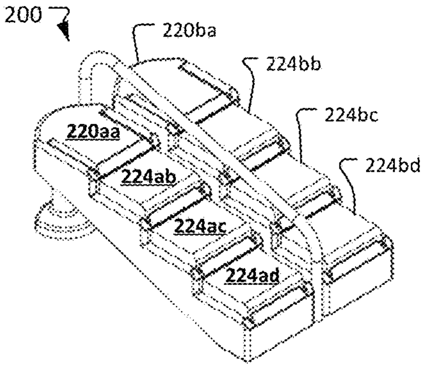

Referring to FIGS. 8A-C, another optional feature that can be incorporated into the assistance devices described herein is depicted. That is, the elevations of the platforms can be adjusted by the use of longitudinally-translatable shelves that can be manually extended or retracted as desired by the user.

In FIG. 8A, the shelves are retracted so that the configuration of the assistance device 200 is the same as that of FIGS. 4-7. That is, the elevations of the platforms 220*aa*, 220*ab*, 220*ac*, and 220*ad* and 220*ba*, 220*bb*, 220*bc*, and 220*bd* are the same as described above.

In FIG. 8C, the shelves 224*ab*, 224*ac*, and 224*ad* are fully extended so that the platforms of the first structure 210*a*, for example, are comprised of 220*aa*, 224*ab*, 224*ac*, and 224*ad*. The thickness of the shelves 224*ab*, 224*ac*, and 224*ad* add to the elevation (in comparison to the elevations of the platforms 220*ab*, 220*ac*, and 220*ad*, for example).

In FIG. 8B, the shelves 224*ab*, 224*ac*, and 224*ad* are shown in a middle position. Accordingly, in this configuration the difference in elevation between adjacent platforms is lessened (e.g., cut in half, in some embodiments), due to the thickness of the shelves 224*ab*, 224*ac*, and 224*ad*.

Figure 9A:
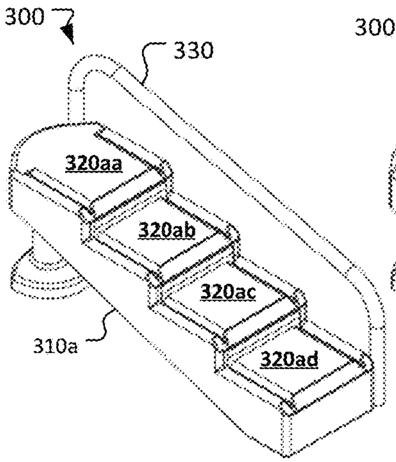
FIGS. 9A-C show perspective views of another example assistance device in accordance with some embodiments.
Figure 9B:
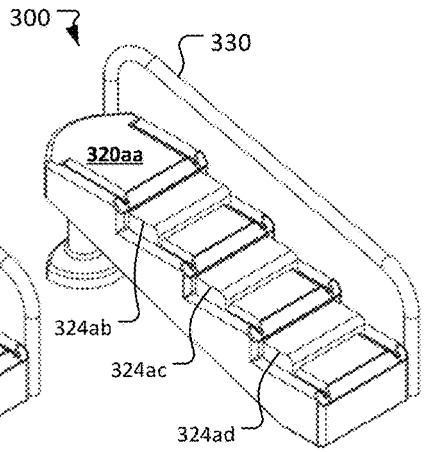
Figure 9C:
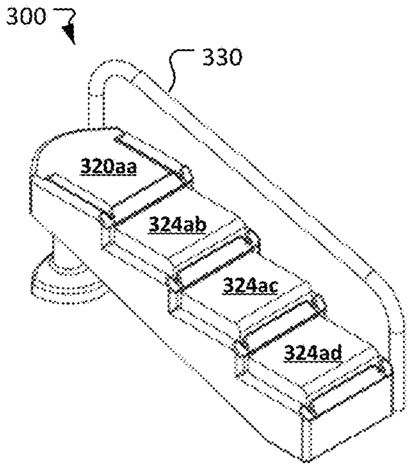

FIGS. 9A-C show another example assistance device 300. This is much like the assistance device 200, but has a single structure 310*a* instead of the dual structures 210*a-b* of the assistance device 200.

The assistance device 300 includes an optional handrail 330 and two longitudinally-extending grooves in each of the platforms 320*aa*, 320*ab*, 320*ac*, and 320*ad*.

The assistance device 300 also includes longitudinally-translatable shelves 324*ab*, 324*ac*, and 324*ad* that can be manually extended or retracted as desired by the user. In FIG. 9A, the shelves 324*ab*, 324*ac*, and 324*ad* are not visible because they are fully retracted. In FIG. 9B, the shelves 324*ab*, 324*ac*, and 324*ad* are partially extended (in a middle configuration). In FIG. 9C, the shelves 324*ab*, 324*ac*, and 324*ad* are fully extended to cover the platforms 320*ab*, 320*ac*, and 320*ad*.

FIGS. 10A-D depict another example assistance device 400. This embodiment shows another optional feature that can be incorporated in any of the assistance device designs described herein. Namely, the assistance device 400 includes an adjustable support member 440 that is movably coupled to the first structure 410. When extended from the first structure 410, the support member 440 is configured to rest on a surface such as the ground, pavement, and the like.

Figure 10A:
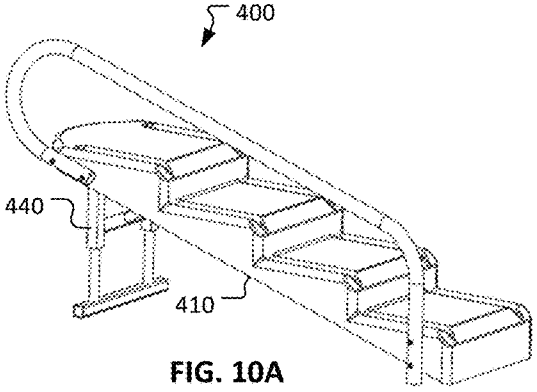
FIGS. 10A-D show perspective views of another example assistance device in accordance with some embodiments.
Figure 10B:
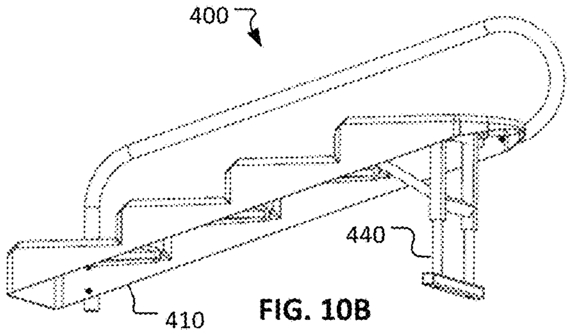
Figure 10C:
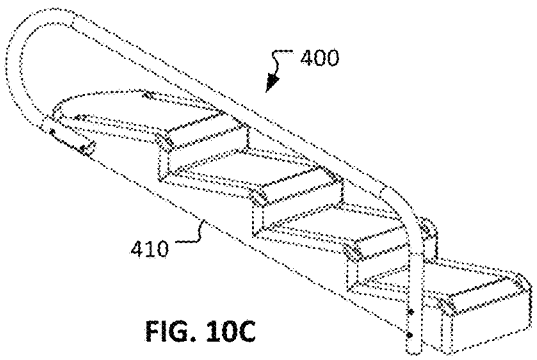
Figure 10D:
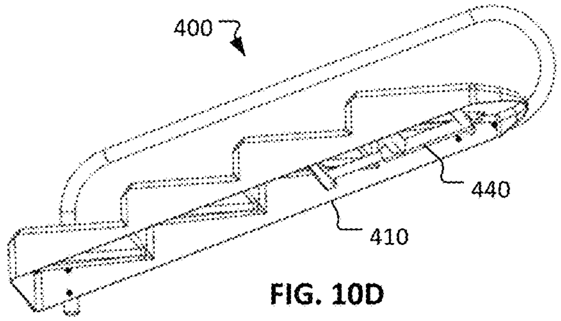

The support member 440 is movably attached (e.g., pivotable) to the first structure 410. That is, the support member 440 is movable relative to the first structure 410 between: (i) a first position that extends from the first structure 410 and (ii) a second position in which the support member 440 is retracted closer to the first structure 410 than in the first position. The first position is depicted in FIGS. 10A and 10B. The second position is depicted in FIGS. 10C and 10D.

This feature enhances the portability of the assistance device 400, because the support member 440 can be retracted. Moreover, in the depicted embodiment the length of the support member 440 is adjustable.

FIGS. 11A-D depict another example assistance device 500. This embodiment shows another optional feature that can be incorporated in any of the assistance device designs described herein. Namely, the assistance device 500 includes a shelf 524*d* that is movably coupled to the first structure 510.

Figure 11A:
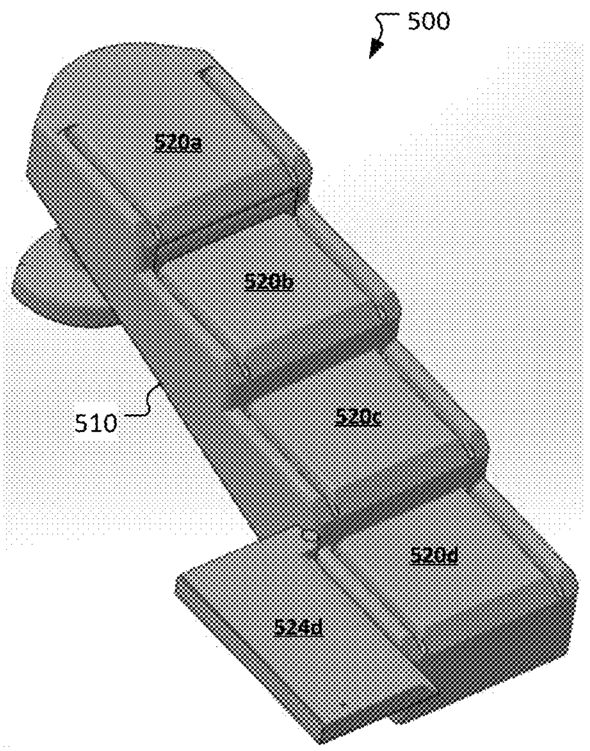
FIGS. 11A-D show perspective views of another example assistance device in accordance with some embodiments.
Figure 11B:
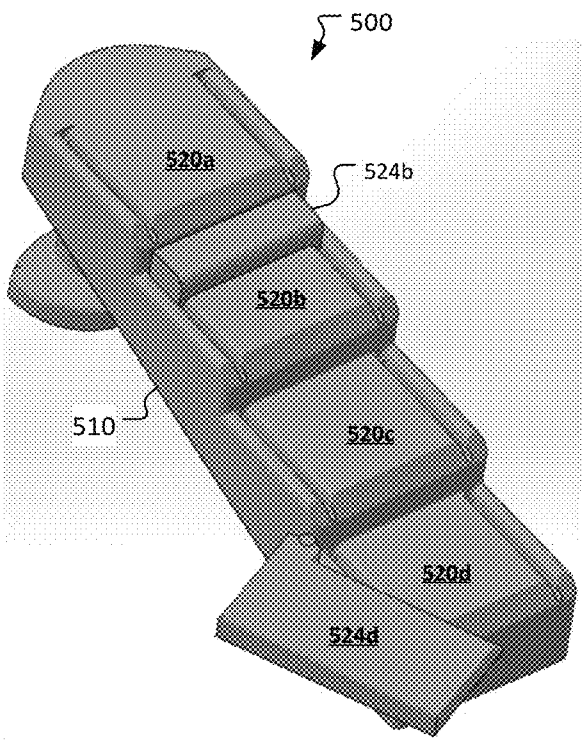
Figure 11C:
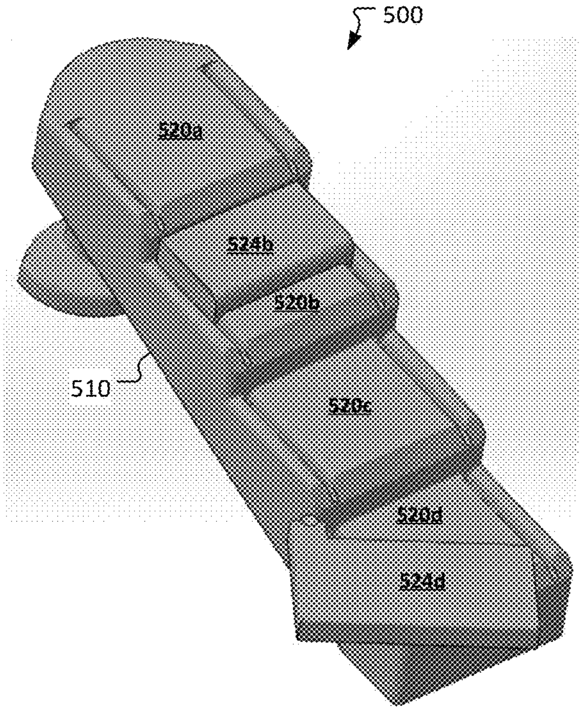
Figure 11D:
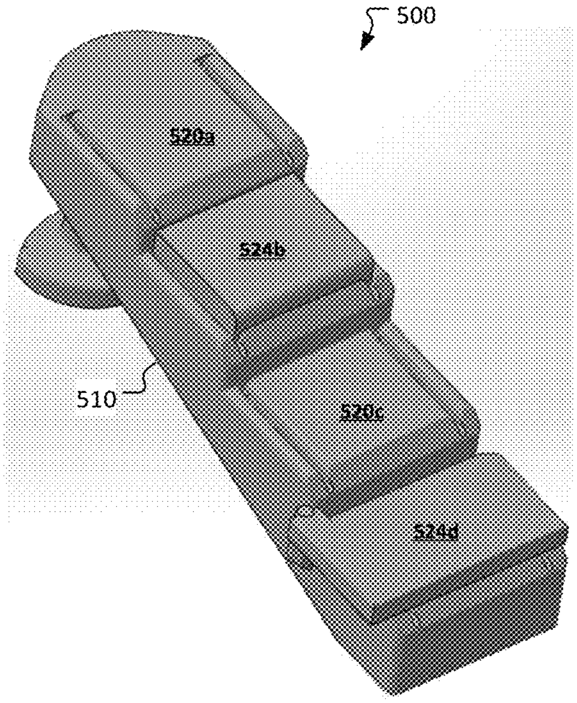

In the depicted embodiment, the shelf 524*d* is pivotably coupled to the first structure 510 such that the shelf 524*d* can be pivoted to extend adjacent to the lowest platform 520*d* (FIG. 11A), or to cover the lowest platform 520*d* (FIG. 11D).

Such a pivotable shelf 524*d* can be useful to the user for physically moving themselves from the low level of the assistance device 500 to another apparatus, such as a hand-cycle. In some embodiments, a pivotable shelf can be included for one or more other platforms, including the uppermost platform 520*a*. In some embodiments, the platforms 520*a*, 520*b*, 520*c*, and/or 520*d* are themselves are pivotable from the structure 510.

Of note is that the assistance device 500 also includes a longitudinally-translatable shelf 524*b*. This exemplifies that any of the features described herein can be combined in any of the embodiments of the assistance devices, in any combination. For example, while no handrail is depicted as part of the assistance device 500, in some embodiments a handrail is included.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings or described in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments.

Particular embodiments of the subject matter have been described. Other embodiments are within the scope of the following claims. For example, actions recited in the claims (if any) can be performed in a different order and still achieve desirable results.

What is claimed is:

1. A device for assisting a person with limited mobility to transfer between a wheelchair and another apparatus, the device comprising:

a first structure positionable on a surface and having a plurality of first platforms at differing elevations relative to the surface, the plurality of first platforms positioned adjacent to each other along a first longitudinal axis of the first structure; and a handrail extending longitudinally along a first lateral side of the first structure such that access to an opposite, second lateral side of the first structure is clear of the handrail and any other obstructions, wherein the handrail extends above the plurality of first platforms at an elevation suitable for the person with limited mobility to grip the handrail while moving, in a seated position, from one elevation to another along the plurality of first platforms, wherein an edge portion of a surface of at least one platform of the plurality of first platforms is indented to create an incorporated hand gripping structure comprising an elongate groove extending parallel to the first longitudinal axis, and wherein the groove of the incorporated hand gripping structure has a depth and width sufficient to allow the person with limited mobility to grip an edge portion of the at least one platform while moving, in the seated position, from one elevation to another along the plurality of first platforms.

2. The device of claim 1, wherein the plurality of first platforms comprises four platforms.

3. The device of claim 2, wherein a surface of each platform of the four platforms defines the groove extending parallel to the first longitudinal axis.

4. The device of claim 2, wherein a surface of each platform of the four platforms defines two of the grooves extending parallel to the first longitudinal axis.

5. The device of claim 1, further comprising a second structure positionable on the surface and having a plurality of second platforms at differing elevations relative to the surface, the plurality of second platforms positioned adjacent to each other along a second longitudinal axis of the second structure, wherein the handrail extends between the first structure and the second structure such that access to an opposite, second lateral side of the second structure is clear of the handrail and any other obstructions.

6. The device of claim 5, wherein the handrail includes a bifurcated lower end.

7. The device of claim 5, wherein the handrail includes a horizontally-extending handrail at an upper end of the handrail.

8. The device of claim 1, further comprising a shelf that is longitudinally translatable relative to the first structure between: (i) a first position in which the shelf covers a particular platform of the plurality of first platforms and (ii) a second position in which the particular platform is not covered by the shelf.

9. The device of claim 1, further comprising a shelf that is pivotable relative to the first structure between: (i) a first position in which the shelf covers a particular platform of the plurality of first platforms and (ii) a second position in which the particular platform is not covered by the shelf.

10. The device of claim 1, further comprising a support member extending from the first structure and configured to rest on or be attached to the surface.

11. The device of claim 1, further comprising a support member attached to the first structure, wherein the support member is movable relative to the first structure between: (i) a first position that extends from the first structure and (ii) a second position in which the support member is retracted closer to the first structure than in the first position.

12. The device of claim 11, wherein the support member is pivotable relative to the first structure.

13. The device of claim 12, wherein a length of the support member is adjustable.

* * * * *